(12) United States Patent
Lei et al.

(10) Patent No.: US 11,797,390 B2
(45) Date of Patent: Oct. 24, 2023

(54) METHOD, DEVICE, AND COMPUTER PROGRAM PRODUCT FOR MANAGING SCHEDULING OF BACKUP TASK

(71) Applicant: EMC IP Holding Company LLC, Hopkinton, MA (US)

(72) Inventors: Boda Lei, Chengdu (CN); Wei Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 530 days.

(21) Appl. No.: 16/896,435

(22) Filed: Jun. 9, 2020

(65) Prior Publication Data
US 2021/0303410 A1  Sep. 30, 2021

(30) Foreign Application Priority Data
Mar. 25, 2020  (CN) .......................... 202010220592.3

(51) Int. Cl.
*G06F 11/14* (2006.01)
*G06F 9/48* (2006.01)
*G06F 3/06* (2006.01)

(52) U.S. Cl.
CPC .......... *G06F 11/1461* (2013.01); *G06F 3/065* (2013.01); *G06F 3/0619* (2013.01); *G06F 3/0673* (2013.01); *G06F 9/4881* (2013.01); *G06F 2201/805* (2013.01)

(58) Field of Classification Search
CPC .... G06F 11/1461; G06F 3/0619; G06F 3/065; G06F 3/0673; G06F 9/4881; G06F 2201/805

USPC ......................................................... 707/654
See application file for complete search history.

(56) References Cited

U.S. PATENT DOCUMENTS

| 9,256,448 B2 * | 2/2016 | Campbell | G06F 9/4881 |
| 2008/0244601 A1 * | 10/2008 | Zeis | G06F 11/1458 714/E11.197 |
| 2009/0300633 A1 * | 12/2009 | Altrichter | G06F 9/4856 711/E12.001 |

\* cited by examiner

*Primary Examiner* — Robert W Beausoliel, Jr.
*Assistant Examiner* — Lauren Zannah Ganger
(74) *Attorney, Agent, or Firm* — WOMBLE BOND DICKINSON (US) LLP

(57) ABSTRACT

Embodiments of the present disclosure relate to a method, a device, and a computer program product for managing scheduling of a backup task. A method for managing scheduling of a backup task is provided, including: acquiring a scheduling setting for a target backup task, the scheduling setting specifying at least a start time of executing the target backup task in a backup system; acquiring execution information associated with execution of the target backup task according to the scheduling setting; and determining a score for the scheduling setting based on the execution information, the score indicating a degree of impact of the execution of the target backup task according to the scheduling setting on the performance of the backup system. With the embodiments of the present disclosure, the scheduling setting can be evaluated, thereby optimizing the scheduling of a backup task and improving the performance of a backup system.

20 Claims, 7 Drawing Sheets

METHOD, DEVICE, AND COMPUTER PROGRAM PRODUCT FOR MANAGING SCHEDULING OF BACKUP TASK

CROSS-REFERENCE TO RELATED APPLICATION

This patent application claims priority, under 35 U.S.C. § 119, of Chinese Patent Application No. 202010220592.3, filed Mar. 25, 2020, which is incorporated by reference in its entirety.

TECHNICAL FIELD

Embodiments of the present disclosure generally relate to the field of information processing, and in particular, to a method, a device, and a computer program product for managing scheduling of a backup task.

BACKGROUND

In a data protection system, scheduling of backup tasks is a very important task. Improper scheduling settings will cause many problems. For example, if a backup task occurs during a peak IO period of a backup client terminal, an IO delay will be significantly increased and various services running on the client terminal will consequently become unavailable. In addition, if too many backup tasks are scheduled in the same time interval, performance of a backup server will be degraded due to concurrently executed tasks, and the backup server will also become unstable consequently.

At present, the scheduling of backup tasks is set by a system administrator based on his/her experience. The problem is that the system administrator often cannot know whether the current scheduling setting is appropriate for the backup client terminal and the backup server.

SUMMARY OF THE INVENTION

A method, a device, and a computer program product for managing scheduling of a backup task are provided in embodiments of the present disclosure.

In a first aspect of the present disclosure, a method for managing scheduling of a backup task is provided, including: acquiring a scheduling setting for a target backup task, the scheduling setting specifying at least a start time of executing the target backup task in a backup system; acquiring execution information associated with execution of the target backup task according to the scheduling setting; and determining a score for the scheduling setting based on the execution information, the score indicating a degree of impact of the execution of the target backup task according to the scheduling setting on the performance of the backup system.

In a second aspect of the present disclosure, an electronic device is provided. The electronic device includes: at least one processing unit; and at least one memory coupled to the at least one processing unit and storing instructions configured to be executed by the at least one processing unit, wherein when executed by the at least one processing unit, the instructions cause the electronic device to perform actions including: acquiring a scheduling setting for a target backup task, the scheduling setting specifying at least a start time of executing the target backup task in a backup system; acquiring execution information associated with execution of the target backup task according to the scheduling setting; and determining a score for the scheduling setting based on the execution information, the score indicating a degree of impact of the execution of the target backup task according to the scheduling setting on the performance of the backup system.

In a third aspect of the present disclosure, a computer program product is provided. The computer program product is tangibly stored on a non-transitory computer-storage medium and including machine-executable instructions. When executed by the device, the machine-executable instructions cause the device to perform any step described according to the first aspect of the present disclosure.

The summary is provided to introduce the choice of concepts in a simplified form, which will be further described in the following Detailed Description. The summary is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings. In the example embodiments of the present disclosure, the same reference numerals generally represent the same members.

Like or corresponding numerals represent like or corresponding parts in various drawings.

DETAILED DESCRIPTION

Figure 1:
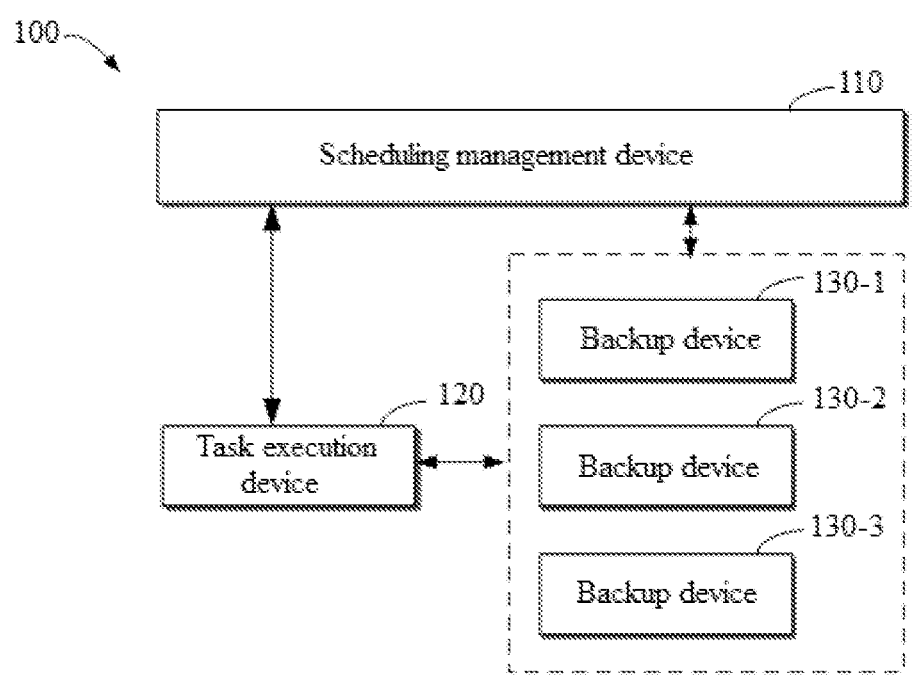
FIG. 1 is a block diagram of an example scheduling management system in which an embodiment of the present disclosure can be implemented.

Embodiments of the present disclosure will be described in more detail below with reference to the accompanying drawings. Although the embodiments of the present disclosure are shown in the accompanying drawings, it should be appreciated that the present disclosure can be implemented in various forms and should not be limited by the embodiments described here. In contrast, the embodiments are provided to make the present disclosure more thorough and complete, and to fully convey the scope of the present disclosure to those skilled in the art.

The term "include" and its variants as used herein indicate open-ended inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, the scheduling of backup tasks is a very important task in a data protection system. Excellent scheduling settings can guarantee data security and service availability. In contrast, improper scheduling settings may cause many problems.

Conventionally, for backup client terminals, such as in virtual platform-based backup client terminals, image-level backup is usually provided according to a platform snapshot technology. Although this is a fast and simple way to back up data, such a backup process will affect the input-output (TO) performance of a client terminal, especially while a host is merging incremental snapshot files. If a backup task occurs during a peak IO period of the client terminal, it will significantly increase the IO delay and make various services running on the client terminal unavailable.

In addition, for a backup server, if too many backup tasks are scheduled in the same time interval, the performance of the backup server may be degraded due to concurrently executed tasks. In this case, each backup task will take more time or even be delayed, and this may also make the backup server unstable. For some backup systems, if a backup task runs during system maintenance, it will degrade the performance of the entire backup system.

At present, the scheduling of backup tasks is set by a system administrator based on his/her experience. The problem is that the system administrator often cannot know whether the current scheduling setting is appropriate for a backup client terminal and a backup server, especially when the system administrator needs to manage a large infrastructure having a large number of client terminals and backup scheduling settings.

A solution for managing scheduling of a backup task is provided in an embodiment of the present disclosure to solve one or more of the above problems and other potential problems. In the solution, scheduling settings of backup tasks are evaluated based on real backup client terminal performance data and a real state of the backup server during operations, so that the system administrator can know whether the backup system is in an excellent operation state and whether the scheduling settings need to be adjusted.

FIG. 1 is a block diagram of example scheduling management system 100 in which an embodiment of the present disclosure can be implemented. As shown in FIG. 1, scheduling management system 100 includes scheduling management device 110, task execution device 120, and backup devices 130-1 to 130-3 (collectively referred to as backup device 130). Various methods according to the embodiments of the present disclosure may be implemented at scheduling management device 110.

Scheduling management device 110 may be a device capable of determining a score of a scheduling setting. Scheduling management device 110 may be, for example, a computer, a virtual machine, a server, or the like, and the present disclosure is not limited in this regard. Task execution device 120 may be a device capable of backing up data on backup device 130 according to a scheduling setting. Backup device 130 is a device having data to be backed up. Backup device 130 may be, for example, a computer, a virtual machine, a server, or the like, and the present disclosure is not limited in this regard. Scheduling management device 110, task execution device 120, and backup device 130 may communicate with each other through a network, and the network may be, for example, the Internet, an intranet, or the like.

It should be appreciated that the structure of scheduling management system 100 is described for exemplary purposes only, and does not imply any limitation on the scope of the present disclosure. For example, the embodiments of the present disclosure can also be applied to a system different from scheduling management system 100. For example, in FIG. 1, scheduling management device 110 and task execution device 120 are shown as separate devices, but it should be appreciated that scheduling management device 110 and task execution device 120 may also be integrated together. It should be appreciated that specific numbers of the various devices described above are given for illustrative purpose only and do not imply any limitation on the scope of the disclosure. For example, the embodiments of the present disclosure may also be applied to more or fewer backup devices.

Figure 2:
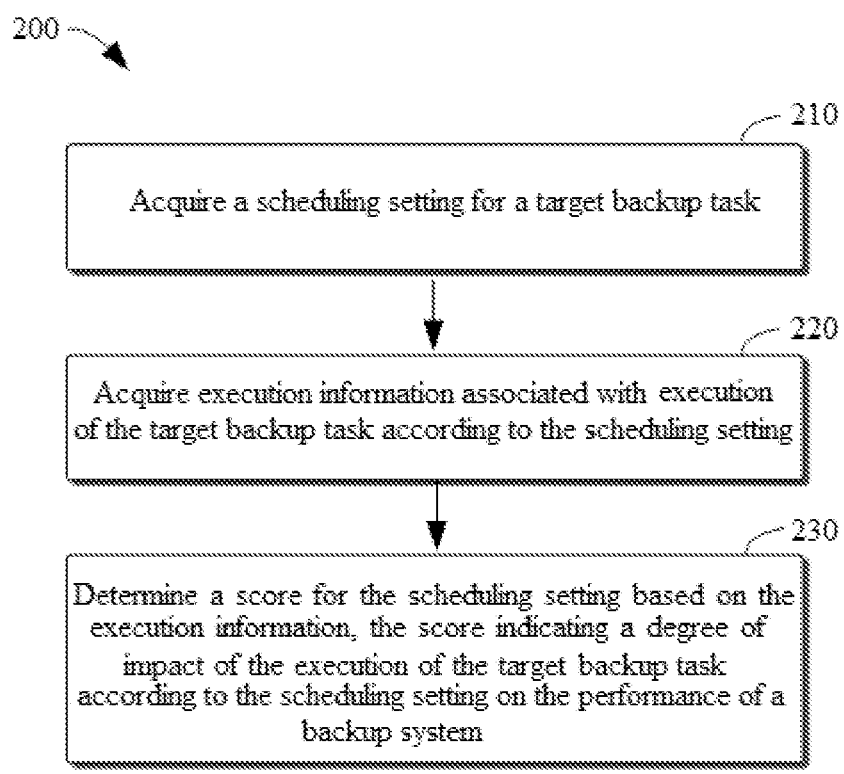
FIG. 2 is a flowchart of an example method for managing scheduling of a backup task according to an embodiment of the present disclosure.

FIG. 2 is a flowchart of example method 200 for managing scheduling of a backup task according to an embodiment of the present disclosure. For example, method 200 may be performed by scheduling management device 110 shown in FIG. 1. It should be appreciated that method 200 may also be performed by other devices, and the scope of the present disclosure is not limited in this regard. It should also be appreciated that method 200 may also include additional actions not shown and/or omit the actions shown, and the scope of the present disclosure is not limited in this regard.

In 210, scheduling management device 110 acquires a scheduling setting for a target backup task.

In some embodiments, the scheduling setting may specify a start time for executing a target backup task in a backup system. The backup system may include task execution device 120 and backup device 130. The start time may range from 0:00 to 23:59. For example, a scheduling setting may specify that a target backup task should begin at 9:00 AM every day. The target backup task may be backing up data on one or more backup devices 130.

In 220, scheduling management device 110 acquires execution information associated with the execution of the target backup task according to the scheduling setting.

In some embodiments, scheduling management device 110 may acquire various kinds of information from task execution device 120 and backup device 130, and then determine, from the acquired various kinds of information, the execution information associated with the execution of the target backup task according to the scheduling setting, for subsequently determining a degree of impact of the execution of the target backup task according to the scheduling setting on the performance of the backup system.

For example, in some embodiments, scheduling management device 110 may first determine an execution time interval in which the target backup task is executed. For example, scheduling management device 110 may determine the execution time interval by acquiring a historical execution duration and a start time of the target backup task. For example, the acquired start time of the target backup task is 9:00 and the historical execution duration is 1 hour. Then, scheduling management device 110 may determine that the execution time interval of the target backup task is 9:00 to 10:00. Then, scheduling management device 110 may determine various kinds of execution information related to the execution time interval.

Figure 3A:
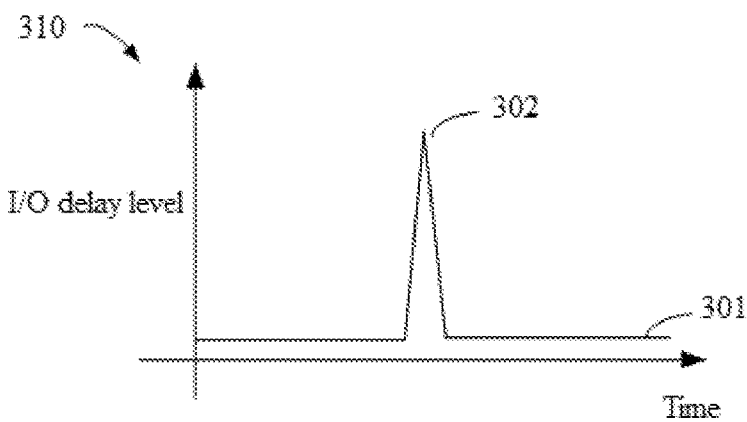
FIG. 3A is a schematic diagram of a profile of an impact of writing data to a backup system on I/O delay according to an embodiment of the present disclosure.

For example, in some embodiments, scheduling management device 110 may determine an amount of data written to the backup system within the execution time interval. For ease of description, such execution information is also simply referred to as "amount of written data" hereinafter. Additionally or alternatively, scheduling management device 110 may determine an amount of data written to backup device 130 within the execution time interval. Since incremental snapshot files will be merged at the end of the backup process, a larger amount of data written to the backup device during the backup process will result in a longer I/O delay. FIG. 3A is a schematic diagram of profile 310 of an impact of writing data to a backup system on I/O delay according to an embodiment of the present disclosure. As shown in FIG. 3A, a horizontal axis represents time, and a vertical axis represents an I/O delay level. Level 301 indicates an I/O delay level in a general case, and level 302 indicates an I/O delay level in a case where hundreds of megabytes of data are written to backup device 130. As can be seen from FIG. 3A, the "amount of written data" will significantly affect the performance of the backup system.

Additionally or alternatively, in some embodiments, scheduling management device 110 may determine a number of backup tasks that are executed concurrently within the execution time interval, and the number exceeds a threshold number. For ease of description, such execution information will also be simply referred to as the "number of parallel tasks" hereinafter. It should be easy to understand that a larger number of backup tasks executed concurrently in the backup system will result in a greater degradation of the performance of the backup system, especially of task execution device 120, and task execution device 120 may also become unstable. Therefore, determining the number of concurrently executed backup tasks can be used for subsequently determining the degree of impact of the execution of the target backup task according to the scheduling setting on the performance of the backup system. Such execution information is described below with reference to FIG. 3B.

Figure 3B:
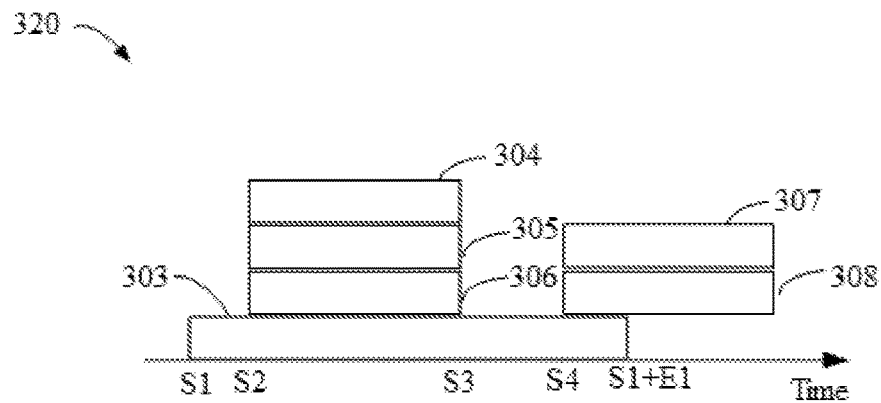
FIG. 3B is a schematic diagram of a scenario in which backup tasks are executed concurrently according to an embodiment of the present disclosure.

FIG. 3B is a schematic diagram of a scenario 320 in which backup tasks are executed concurrently according to an embodiment of the present disclosure. As shown in FIG. 3B, the horizontal axis represents time, and backup task 303 is a target backup task having a start time 51 and an execution duration E1. In the execution interval S1 to S1+E1 of backup task 303, backup tasks 304 to 308 are also executed at the same time. As shown in FIG. 3B, in the time interval S2 to S3, the number of concurrently executed backup tasks is 4, and in the time interval S4 to S1+E1, the number of concurrently executed backup tasks is 3. If the threshold number is 3, scheduling management device 110 may determine that the number of the backup tasks that are concurrently executed within the execution time interval S1 to S1+E1 is 4, which exceeds the threshold number.

Additionally or alternatively, in some other embodiments, scheduling management device 110 may determine a total number of backup tasks executed at least partially within the execution time interval. For ease of description, such execution information will also be simply referred to as the "total number of tasks" hereinafter. Still referring to FIG. 3B, in this example, scheduling management device 110 may determine that the total number of backup tasks executed within the execution time interval is 6. Alternatively, when determining the total number, scheduling management device 110 may also exclude the target backup task. For example, in this example, scheduling management device 110 determines the total number to be 5.

Figure 3C:
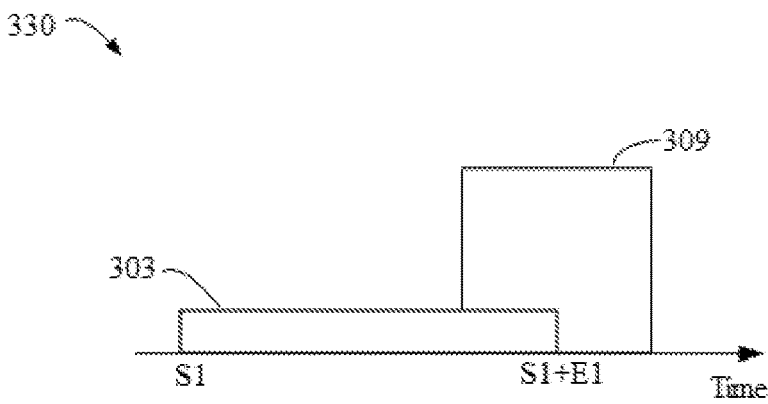
FIG. 3C is a schematic diagram of a scenario in which an execution time interval of a target backup task partially overlaps a system maintenance time interval according to an embodiment of the present disclosure.

Additionally or alternatively, in some embodiments, scheduling management device 110 may determine whether the execution time interval at least partially overlaps the system maintenance time interval of the backup system. For ease of description, such execution information will also be simply referred to as the "system maintenance overlap" in the following. In some cases, if a backup task occurs during system maintenance, the maintenance process of the system may be affected, and the system performance may be degraded. Therefore, it is undesirable that the execution time interval of the backup task overlaps the system maintenance time interval. FIG. 3C is a schematic diagram of a scenario 330 in which an execution time interval of a target backup task partially overlaps a system maintenance time interval according to an embodiment of the present disclosure. As shown in FIG. 3C, the horizontal axis represents time, and the execution time interval of target backup task 303 partially overlaps the system maintenance time interval. In this case, the performance of the backup system may be affected.

Returning now to FIG. 2, in 230, scheduling management device 110 may determine a score for the scheduling setting according to the execution information, the score indicating the degree of impact of the execution of the target backup task according to the scheduling setting on the performance of the backup system.

As mentioned above, different execution information may indicate, from different aspects, an impact of the execution of the target backup task according to the scheduled setting on the performance of the backup system. Therefore, in some embodiments, scheduling management device 110 may first determine a first criterion associated with the execution information, the first criterion being used for evaluating the degree of impact of the execution information on the performance of the backup system, and then determining, according to the first criterion, a level of impact of the execution information on the performance of the backup system.

For example, in some embodiments, for the amount of written data within the execution time interval of the target backup task, scheduling management device 110 may determine the following Table 1 as the first criterion associated with this type of execution information.

TABLE 1

First criterion associated with the amount of written data

| Level | Definition |
| --- | --- |
| 1 | amount of written data < 100 MB |
| 3 | amount of written data < 200 MB |
| 5 | amount of written data < 500 MB |
| 7 | amount of written data < 800 MB |
| 9 | amount of written data >= 800 MB |

Additionally or alternatively, in some embodiments, for the number of parallel tasks in the execution time interval of the target backup task, scheduling management device 110 may determine the following Table 2 as the first criterion associated with this type of execution information, wherein Cmax is an upper limit of tasks that can be executed by task execution device 120 concurrently.

TABLE 2

First criterion associated with the number of parallel tasks

| Level | Definition |
|---|---|
| 1 | Number of parallel tasks < 40%*Cmax |
| 3 | Number of parallel tasks < 60%*Cmax |
| 5 | Number of parallel tasks < 70%*Cmax |
| 7 | Number of parallel tasks < 90%*Cmax |
| 9 | Number of parallel tasks >= 100%*Cmax |

Additionally or alternatively, in some embodiments, for the total number of tasks within the execution time interval of the target backup task, scheduling management device 110 may determine the following Table 3 as the first criterion associated with the execution information, wherein Tsum is a total number of backup tasks in task execution device 120.

TABLE 3

First criterion associated with the total number of tasks

| Level | Definition |
|---|---|
| 1 | Total number of tasks < 10%*Tsum |
| 3 | Total number of tasks < 30%*Tsum |
| 5 | Total number of tasks < 50%*Tsum |
| 7 | Total number of tasks < 70%*Tsum |
| 9 | Total number of tasks >= 70%*Tsum |

Additionally or alternatively, in some embodiments, for system maintenance overlap, scheduling management device 110 may determine the following Table 4 as the first criterion associated with this type of execution information.

TABLE 4

First criterion associated with system maintenance overlap

| Level | Definition |
|---|---|
| 0 | The execution time interval of the target backup task does noto verlap the system maintenance time interval |
| 1 | The execution time interval of the target backup task at least partially overlaps the system maintenance time interval |

After determining the level of execution information, scheduling management device 110 may determine a score for the scheduling setting according to the level.

For example, in some embodiments, for the three pieces of execution information of "amount of written data," "number of parallel tasks," and "total number of tasks," scheduling management device 110 may determine the threshold level as 7. For the execution information of "system maintenance overlap," scheduling management device 110 may determine the threshold level as 1. If scheduling management device 110 determines that the level of execution information is higher than or equal to a threshold level, it determines a score for the scheduling setting from a first score range, and the first score range indicates that the scheduling setting is not suitable for the target backup task. For example, taking the execution information of the amount of written data as an example, the first score range is 0-59 points. If scheduling management device 110 determines that the level of the amount of written data is 7, the score of the scheduling setting is determined as 40 points; and if scheduling management device 110 determines that the level of the amount of written data is 9, the score of the scheduling setting is determined as 20 points. In contrast, if scheduling management device 110 determines that the level of the execution information is lower than the threshold level, it determines a score for the scheduling setting from a second score range, and the second score range indicates that the scheduling setting is suitable for the target backup task. For example, the second score range is 60-100 points. If scheduling management device 110 determines that the level of the amount of written data is 5, the score of the scheduling setting is determined as 60 points; and if scheduling management device 110 determines that the level of the amount of written data is 3, the score of the scheduling setting is determined as 80 points, and so on. In this way, the administrator of the backup system can determine whether the scheduling setting is suitable for the target backup task based on the score, and then determine whether the scheduling setting needs to be changed.

Additionally or alternatively, scheduling management device 110 may also determine a weight corresponding to the type of execution information through an analytic hierarchy process (AHP), thereby determining the score for the scheduling setting. Such an embodiment will be described in detail below with reference to FIG. 6.

It should be appreciated that the first criterion and the score range are shown for exemplary purposes only, and do not imply any limitation on the scope of the present disclosure. For example, a first criterion with other levels and definitions can also be used, other score ranges can also be specified, and so on. The present disclosure is not limited in this regard.

In the above exemplary embodiment, by acquiring execution information associated with execution of a target backup task according to a scheduling setting, and then determining a score for the scheduling setting based on the execution information, the scheduling setting may be evaluated. Based on a result of the evaluation, an administrator of a backup system can know whether the scheduling setting is suitable for the target backup task, and then decides whether to adjust the scheduling setting as needed.

In addition, an execution duration of the target backup task and an amount of written data in future may also be determined using the acquired historical execution information, so as to determine whether the scheduling setting is suitable for the target backup task in the future execution time interval. Such prediction can be achieved by a method such as Autoregressive Moving Average Model (ARIMA) and Convolutional Neural Network (CNN).

Figure 4:
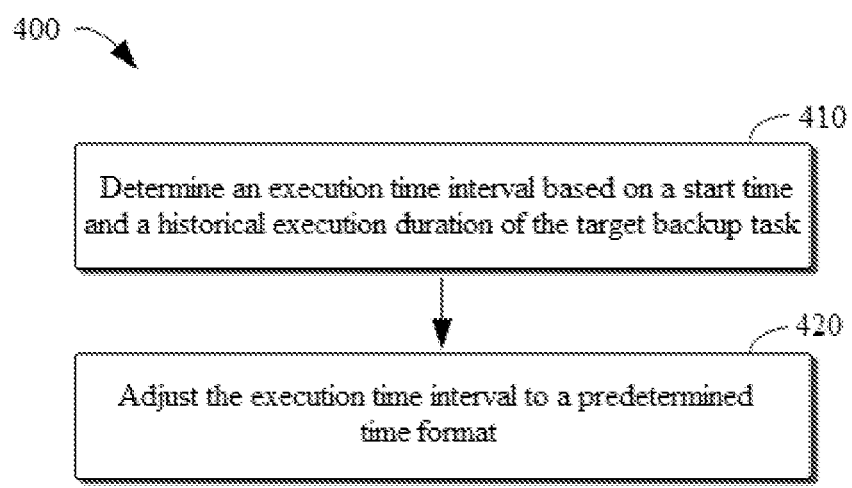
FIG. 4 is a flowchart of an example method for determining an execution time interval according to an embodiment of the present disclosure.

FIG. 4 is a flowchart of example method 400 for determining an execution time interval according to an embodiment of the present disclosure. Method 400 is an embodiment of block 220 in method 200. For example, method 400 may be performed by scheduling management device 110 shown in FIG. 1. It should be appreciated that method 400 may also be performed by other devices, and the scope of the present disclosure is not limited in this regard. It should also be appreciated that method 400 may also include additional actions not shown and/or omit the actions shown, and the scope of the present disclosure is not limited in this regard.

In general, the information directly acquired by scheduling management device 110 from the backup system is arranged according to a one-direction time coordinate. However, when the above-mentioned execution information is determined, especially for a backup task whose start time is earlier than the start time of the target backup task, such one-direction time coordinates are not conducive to calculation, and therefore need to be adjusted.

Figure 5A:
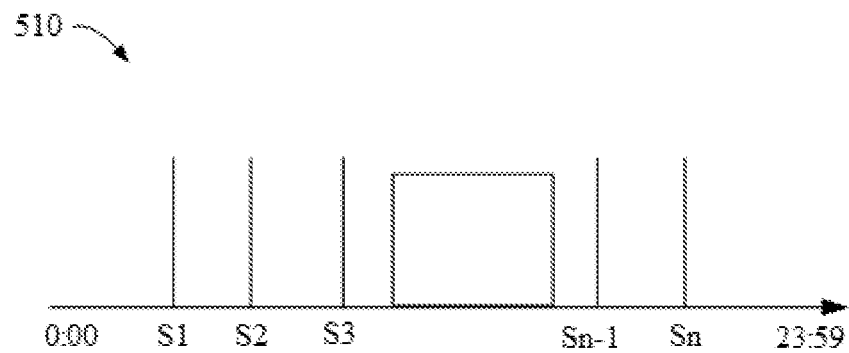
FIG. 5A is a schematic diagram of a one-direction time coordinate according to an embodiment of the present disclosure.

In 410, scheduling management device 110 may determine an execution time interval according to the start time of the target backup task and the historical execution duration. For example, if the start time of the target backup task is 9:00 and the historical execution duration is 1 hour, scheduling management device 110 determines that the execution time interval is 9:00-10:00. FIG. 5A is a schematic diagram of a one-direction time coordinate 510 according to an embodiment of the present disclosure. As shown in FIG. 5A, Si to Sn represent start times of different backup tasks, respectively. A rectangle in the middle indicates the system maintenance time interval.

Figure 5B:
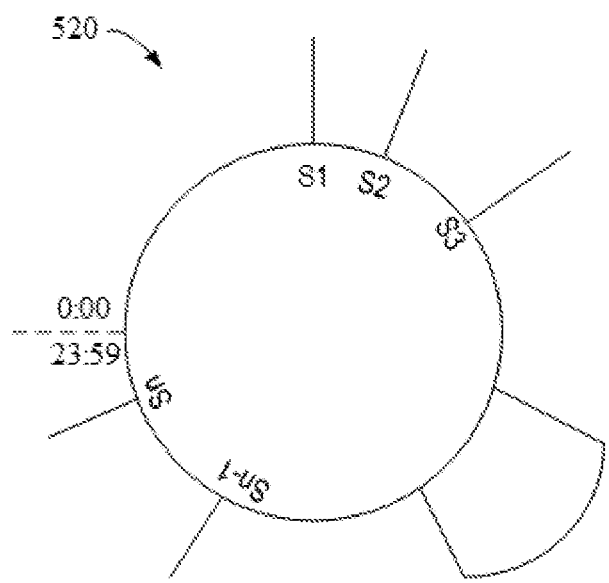
FIG. 5B is a schematic diagram of a ring-shaped time coordinate according to an embodiment of the present disclosure.

In 420, scheduling management device 110 may adjust the execution time interval to a predetermined time format. For example, in some embodiments, scheduling management device 110 may adjust the execution time interval as using the start time of the target backup task as time zero and to be counted in minutes. For example, the execution time interval is originally 9:00-10:00, and scheduling management device 110 may adjust it to 0-59. Additionally or alternatively, scheduling management device 110 may also adjust other times relative to the start time of the target backup task. FIG. 5B is a schematic diagram of a ring-shaped time coordinate 520 according to an embodiment of the present disclosure. As such, execution information can be easily calculated. In addition, this method may also take into account the following factors: since the scheduling setting usually specifies a time when the backup task is executed in every day, the backup task is executed on a 24-hour cycle. For example, when the execution time interval of the target backup task includes 24:00, its impact on other backup tasks whose start time is 0:00 should be considered. With such a ring-shaped time coordinate, execution information can be calculated more accurately.

For example, in some embodiments, in order to determine the execution information of "amount of written data," scheduling management device 110 may set an array AWRA={wr1, wr2, wr3, . . . }, a length of the array being 1440, for saving a writing rate of the backup system corresponding to each minute, and the first element in the array corresponds to the writing rate at the start time of the target backup task. With this array, scheduling management device 110 can conveniently calculate the amount of data written into the backup system during the execution time interval of the target task.

Additionally or alternatively, in some embodiments, in order to determine the execution information of "number of parallel tasks," scheduling management device 110 may set an array BTCA={bc1, bc2, bc3, . . . }, a length of the array being 1440, for saving the number of parallel tasks in the backup system corresponding to each minute, and the first element in the array corresponds to the number of parallel tasks at the start time of the target backup task.

Additionally or alternatively, in some embodiments, in order to determine the execution information of "total number of tasks," scheduling management device 110 may adjust the start time of another backup task relative to the start time of the target backup task. Assuming that the start time of the target backup task is S_J, the start times of other backup tasks in the backup system can be adjusted and saved in the array ASTA_J, ASTA_J={(S_(J+1)−S_J), (S_N−S_J), (S_1+24−S_J), (S_2+24−S_J) (S_(J−1)+24−S_J)}, where S_(J+1) to S_N are times later than S_J, and S_1 to S_(J−1) are earlier than S_J. In this way, scheduling management device 110 can conveniently determine which backup tasks occur at least partially within the execution time interval of the target backup task.

Additionally or alternatively, in some embodiments, in order to determine the execution information "system maintenance overlap," scheduling management device 110 may adjust the system maintenance time relative to the start time of the target backup task. For example, if the start time of system maintenance MW_S>=S_J, MW_S is adjusted to MW_S-S_J; and if the start time of system maintenance MW_S<S_J, MW_S is adjusted to MW_S+24-S_J.

It should be appreciated that the predetermined time format is shown for exemplary purposes only and does not imply any limitation on the scope of the present disclosure. For example, the execution time interval may also be adjusted using other time formats. The present disclosure is not limited in this regard.

In the above-mentioned exemplary embodiment, by adjusting the execution time interval of the target task to the predetermined time format, the amount of calculation can be reduced and the execution information can be more accurately determined, thereby facilitating determining the score for the scheduling setting.

Figure 6:
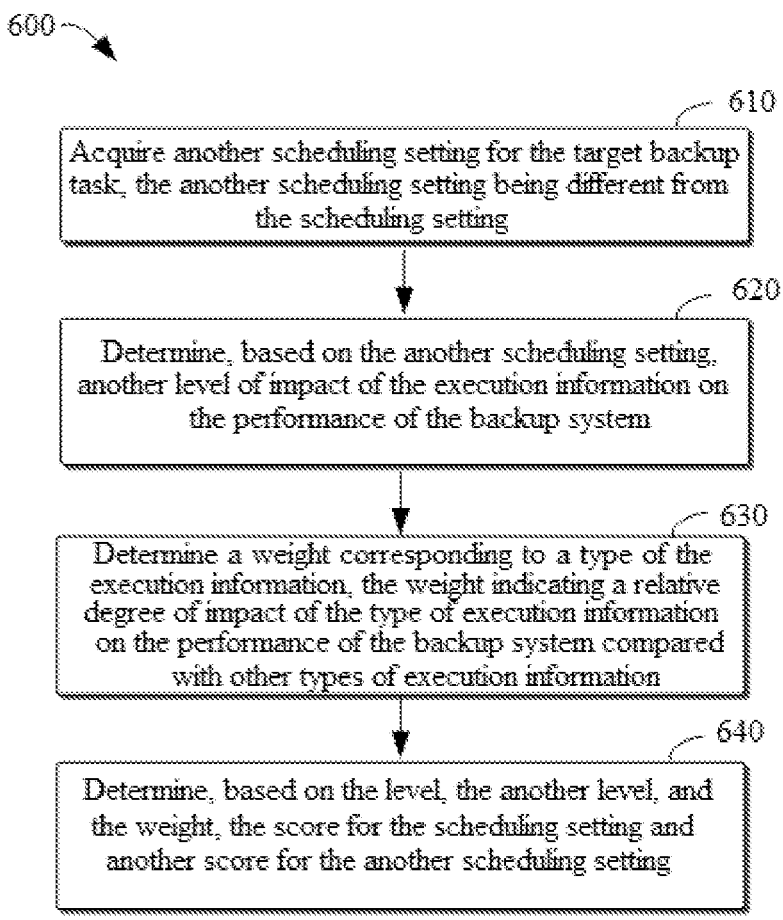
FIG. 6 is a flowchart of an example method for determining a score for scheduling setting according to an embodiment of the present disclosure.

FIG. 6 is a flowchart of example method 600 for determining a score for scheduling setting according to an embodiment of the present disclosure. Method 600 is an embodiment of block 230 in method 200. For example, method 600 may be performed by scheduling management device 110 shown in FIG. 1. It should be appreciated that method 600 may also be performed by other devices, and the scope of the present disclosure is not limited in this regard. It should also be appreciated that method 600 may also include additional actions not shown and/or omit the actions shown, and the scope of the present disclosure is not limited in this regard.

In 610, scheduling management device 110 may acquire another scheduling setting for the target backup task, which is different from the scheduling setting. In 620, scheduling management device 110 may determine another level of impact of the execution information on the performance of the backup system according to another scheduling setting. This process is similar to the process of how to determine the level described above with reference to FIG. 2, and will not be repeated here.

In 630, scheduling management device 110 may determine a weight corresponding to the type of execution information, the weight indicating a relative degree of impact of the type of execution information on the performance of the backup system compared with other types of execution information. As mentioned above, different types of execution information can reflect the impact on the performance of the backup system from different aspects. Therefore, relative degrees of the impact of different types of execution information on the performance of the backup system can be taken into account, thereby more accurately evaluating the scheduling setting.

For example, in some embodiments, the execution information of "amount of written data" may affect the I/O delay of the backup device, and therefore, if it intends to ensure that the backup device will not be affected, scheduling management device 110 may determine a weight corresponding to the "amount of written data" as 0.7, and determine an overall weight of other types of execution information as 0.3.

Additionally or alternatively, in other embodiments, scheduling management device 110 may use the AHP to further determine secondary weights corresponding to the other types of execution information. The AHP is a method for making complex decisions. It is applied in many fields and has a main idea of determining assignment of weights to various key indexes by comparing relative importance of the various key indexes, thereby comparing various alternative solutions. For example, scheduling management device 110 may first specify the pairwise relative importance of "number of parallel tasks," "total number of tasks," and "system maintenance overlap" as: number of parallel tasks/system maintenance overlap=9, total number of tasks/system maintenance overlap=7, and number of parallel tasks/total number of tasks=3. According to the AHP, after calculation and consistency check, scheduling management device 110 can determine the secondary weights of the three pieces of execution information as 0.78, 0.15, and 0.07.

Specifically, scheduling management device 110 may generate a relative impact table of the three pieces of execution information according to the specified weights 9, 7, and 1, as shown in Table 5 below.

TABLE 5

Relative impact table of system maintenance overlap, total number of tasks, and number of parallel tasks

|  | System maintenance overlap | Total number of tasks | Number of parallel tasks |
|---|---|---|---|
| System maintenance overlap | 1 | 7 | 9 |
| Total number of tasks | 1/7 | 1 | 3 |
| Number of parallel tasks | 1/9 | 1/3 | 1 |

In other words, a relative impact matrix is $$A_c = \begin{vmatrix} 1 & 7 & 9 \\ \frac{1}{7} & 1 & 3 \\ \frac{1}{9} & \frac{1}{3} & 1 \end{vmatrix},$$

and a weight vector $$W = \begin{vmatrix} 0.78 \\ 0.15 \\ 0.07 \end{vmatrix}$$

can be obtained by using a summation method on this matrix. Then, the consistency check is performed on the acquired weight vector. The maximum feature value $\lambda_{max}$ is calculated first according to the following formula (1):

$$\lambda_{max} = \sum_{k=1}^{n} \frac{(A_C W)_i}{n W_i} \qquad (1)$$

where n is the matrix dimension, W is the acquired weight vector, and $A_c$ is the relative impact matrix. Then, the consistency index CI is calculated according to the following formula (2):

$$CI = \frac{\lambda_{max} - n}{n - 1} \qquad (2)$$

Then, the consistency rate CR is calculated according to the following formula (3):

$$CR = CI/RI \qquad (3)$$

Values corresponding to RI are shown in Table 6 below.

TABLE 6

RI values in the consistency check

| Matrix dimension | 1 | 2 | 3 | 4 | 5 | 6 | 7 | 8 | 9 |
|---|---|---|---|---|---|---|---|---|---|
| RI | 0 | 0 | 0.58 | 0.90 | 1.12 | 1.24 | 1.32 | 1.41 | 1.45 |

In this example, it is calculated that $\lambda_{max}$ is 3.08 and CR is 0.07. If CR is less than 0.1, it means that the consistency check succeeds. Therefore, in this example, scheduling management device 110 determines that the secondary weight vector corresponding to "number of parallel tasks," "total number of tasks," and "system maintenance overlap" is $$W_{bsi} = \begin{vmatrix} 0.78 \\ 0.15 \\ 0.07 \end{vmatrix}.$$

In other words, the secondary weights corresponding to "number of parallel tasks," "total number of tasks," and "system maintenance overlap" are 0.78, 0.15, and 0.07, respectively.

In 640, scheduling management device 110 may determine a score for the scheduling setting and another score for another scheduling setting according to the level, another level, and the weight.

For example, in some embodiments, scheduling management device 110 has determined that the level of execution information of the "amount of written data" type according to the scheduling setting is $AGI_1$, and the level of execution information of the "amount of written data" type according to another scheduling setting is $AGI_2$. Therefore, scheduling management device 110 may generate a relative impact table of the scheduling setting and another scheduling setting, as shown in Table 7 below.

TABLE 7

Relative impact table of a scheduling setting and another scheduling setting

|  | Scheduling setting | Another scheduling setting |
|---|---|---|
| Scheduling setting | 1 | $AGI_2/AGI_1$ |
| Another scheduling setting | $AGI_2/AGI_1$ | 1 |

In other words, the relative impact matrix corresponding to the execution information of the "amount of written data" type is $$A_c = \begin{vmatrix} 1 & \frac{AGI_2}{AGI_1} \\ \frac{AGI_1}{AGI_2} & 1 \end{vmatrix}.$$

According to the summation method, the vector corresponding to this type of execution information can be acquired as $$V_{AGI} = \begin{vmatrix} V_{AGI1} \\ V_{AGI2} \end{vmatrix}.$$

As mentioned above when describing 630, scheduling management device 110 has determined that the weight corresponding to this type of execution information is 0.7. Therefore, scheduling management device 110 may determine that the score for the scheduling setting is $0.7 * V_{AGI1}$, and the score for the another scheduling setting is $0.7 * V_{AGI2}$.

Additionally, in some embodiments, if there are other types of execution information, for example, "number of parallel tasks," "total number of tasks," and "system maintenance overlap," scheduling management device 110 may similarly determine vectors corresponding to the three kinds of execution information as $$V_{bs} = \begin{vmatrix} V_{bs1} \\ V_{bs2} \end{vmatrix}, V_{br} = \begin{vmatrix} V_{br1} \\ V_{br2} \end{vmatrix}, \text{ and } V_{mi} = \begin{vmatrix} V_{mi1} \\ V_{mi2} \end{vmatrix},$$

respectively, and then according to the determined secondary weight vector $$W_{bsi} = \begin{vmatrix} 0.78 \\ 0.15 \\ 0.07 \end{vmatrix},$$

$V_{bsi} = |V_{bs}, V_{br}, V_{mi}| * W_{bsi}$ is obtained. Then, scheduling management device 110 may determine the score for the scheduling setting and the score for another scheduling setting through $$|V_{AGI}, V_{BSI}| * \begin{vmatrix} 0.7 \\ 0.3 \end{vmatrix}.$$

It should be appreciated that the values of the weights are shown for exemplary purposes only and do not imply any limitation on the scope of the disclosure. For example, different types of execution information may also correspond to other weight values. In addition, it should be appreciated that the two scheduling settings are shown for exemplary purposes only and do not imply any limitation on the scope of the present disclosure. For example, the method may also be applicable to a larger number of scheduling settings.

In the above exemplary embodiment, by setting different weights for different types of execution information, the relative degrees of impact of different types of execution information on the performance of the backup system can be taken into account, thereby evaluating the scheduling setting more accurately. In addition, by scoring different scheduling settings, the suitability of different scheduling settings for the same backup task can be compared, which further guides the optimization of the scheduling of backup tasks.

Figure 7:
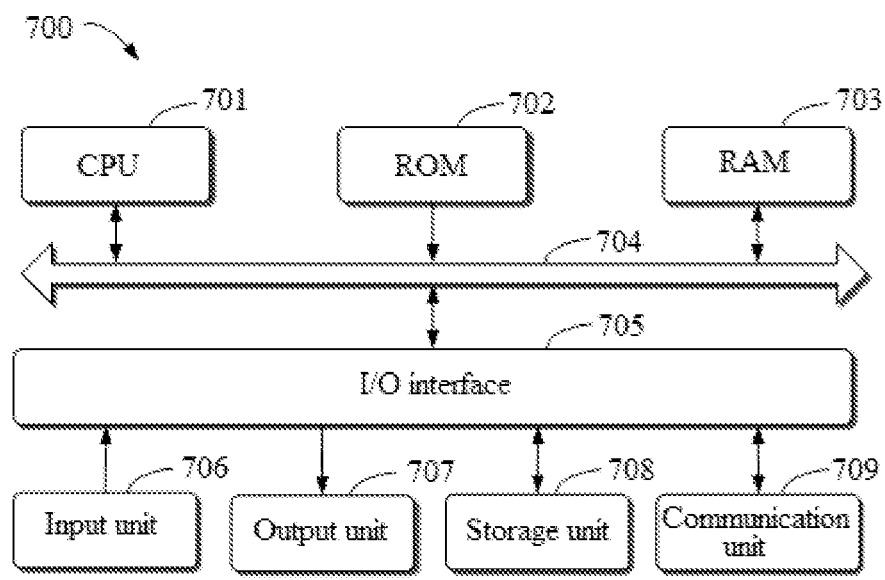
FIG. 7 is a schematic block diagram of an example electronic device that can be configured to implement an embodiment of the present disclosure.

FIG. 7 is a schematic block diagram of example electronic device 700 that can be configured to implement an embodiment of the present disclosure. For example, scheduling management device 110 as shown in FIG. 1 can be implemented by electronic device 700. As shown in FIG. 7, electronic device 700 includes central processing apparatus (CPU) 701 that can perform various appropriate actions and processing according to computer program instructions stored in read-only memory (ROM) 702 or computer program instructions loaded from storage unit 708 to random access memory (RAM) 703. Various programs and data required for the operation of electronic device 700 can also be stored in RAM 703. CPU 701, ROM 702, and RAM 703 are connected to each other through bus 704. Input/output (I/O) interface 705 is also connected to bus 704.

A plurality of components in electronic device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows electronic device 700 to exchange information/data with other devices over a computer network such as the Internet and/or various telecommunication networks.

The various processes and processing described above, for example, methods 200, 400, and 600, may be performed by processing apparatus 701. For example, in some embodiments, methods 200, 400, and 600 can be implemented as a computer software program that is tangibly included in a machine-readable medium such as storage unit 708. In some embodiments, some or all of the computer programs can be loaded and/or installed onto electronic device 700 via ROM 702 and/or communication unit 709. When the computer program is loaded into RAM 703 and executed by CPU 701, one or more steps of methods 200, 400, and 600 described above may be implemented.

The present disclosure may be a method, an apparatus, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions may be executed completely on a user's computer, partially on a user's computer, as a separate software package, partially on a user's computer and partially on a remote computer, or completely on a remote computer or server. In the case where a remote computer is involved, the remote computer can be connected to a user computer over any kind of networks, including a local area network (LAN) or wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product according to the embodiments of the present disclosure. It should be appreciated that each block in the flowcharts and/or block diagrams and a combination of blocks in the flowcharts and/or block diagrams can be implemented by computer-readable program instructions.

The computer-readable program instructions can be provided to a processing apparatus of a general purpose computer, a special purpose computer, or another programmable data processing apparatus to produce a machine, such that the instructions, when executed by the processing apparatus of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause the computer, another programmable data processing apparatus, and/or another device to work in a specific manner, such that the computer-readable medium storing the instructions includes an article of manufacture including instructions for implementing various aspects of functions/actions specified in one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple embodiments of the present disclosure. In this regard, each block in the flowcharts or block diagrams can represent a module, a program segment, or a portion of an instruction that includes one or more executable instructions for implementing the specified logical functions. In some alternative implementations, functions labeled in the blocks may occur in an order different from that as labeled in the accompanying drawings. For example, two successive blocks may actually be performed basically in parallel, or they can be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above. The foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements of technologies on the market, or to enable other persons of ordinary skill in the art to understand the embodiments disclosed here.

The invention claimed is:

1. A method for managing scheduling of a backup task, comprising:
    acquiring a scheduling setting for a target backup task, the scheduling setting specifying at least a start time of executing the target backup task in a backup system;
    acquiring a plurality of types of execution information associated with execution of the target backup task according to the scheduling setting;
    performing a pairwise comparison of each of the plurality of types of execution information, wherein the pairwise comparison determines a relative weight of each of the plurality of types of execution information with respect to every other one of the plurality of types of execution information, respectively; and
    determining a score for the scheduling setting based on the pairwise comparison of each of the plurality of types of the execution information, the score indicating a degree of impact of the execution of the target backup task according to the scheduling setting on a performance of the backup system.

2. The method of claim 1, wherein acquiring the plurality of types of the execution information comprises:
    acquiring a historical execution duration of the target backup task;
    determining, based on the start time and the historical execution duration, an execution time interval in which the target backup task is executed; and determining, based on the execution time interval, at least one of:
  an amount of data written into the backup system within the execution time interval;
  a number of backup tasks executed concurrently within the execution time interval, the number exceeding a threshold number;
  a total number of backup tasks executed at least partially within the execution time interval; and
  whether the execution time interval at least partially overlaps a system maintenance time interval of the backup system.

3. The method of claim 2, wherein determining the execution time interval in which the target backup task is executed comprises:
  determining the execution time interval based on the start time and the historical execution duration; and
  adjusting the execution time interval to a predetermined time format.

4. The method of claim 1, wherein determining the score for the scheduling setting comprises:
  determining a first criterion associated with one or more of the plurality of types of the execution information, the first criterion being used to evaluate a degree of impact of the type of the execution information on the performance of the backup system;
  determining, based on the first criterion associated with the respective type of the execution information, a level of impact for each type of the plurality of types of the execution information on the performance of the backup system; and
  determining the score for the scheduling setting based on the level for each type of the plurality of types of the execution information.

5. The method of claim 4, wherein determining the score for the scheduling setting based on the level comprises:
  determining the score from a first score range according to a determination that the level is not lower than a threshold level, the first score range indicating that the scheduling setting is not suitable for the target backup task; and
  determining the score from a second score range according to a determination that the level is lower than the threshold level, the second score range indicating that the scheduling setting is suitable for the target backup task.

6. The method of claim 4, wherein determining the score for the scheduling setting based on the level comprises:
  acquiring another scheduling setting for the target backup task, the another scheduling setting being different from the scheduling setting;
  determining, based on the another scheduling setting, another level of impact for each of the plurality of types of the execution information on the performance of the backup system;
  determining a weight corresponding to a respective type of the execution information, the weight indicating a relative degree of impact of the type of execution information on the performance of the backup system compared with other types of execution information; and
  determining, based on the level, the another level, and the weight, the score for the scheduling setting and another score for the another scheduling setting.

7. An electronic device, comprising:
  at least one processing unit; and
  at least one memory coupled to the at least one processing unit and storing instructions configured to be executed by the at least one processing unit, wherein when executed by the at least one processing unit, the instructions cause the electronic device to perform actions comprising:
    acquiring a scheduling setting for a target backup task, the scheduling setting specifying at least a start time of executing the target backup task in a backup system;
    acquiring a plurality of types of execution information associated with execution of the target backup task according to the scheduling setting;
    performing a pairwise comparison of each of the plurality of types of execution information, wherein the pairwise comparison determines a relative weight of each of the plurality of types of execution information with respect to every other one of the plurality of types of execution information, respectively; and
    determining a score for the scheduling setting based on a pairwise comparison of each of the plurality of types of the execution information, the score indicating a degree of impact of the execution of the target backup task according to the scheduling setting on a performance of the backup system.

8. The electronic device of claim 7, wherein acquiring the plurality of types of the execution information comprises:
  acquiring a historical execution duration of the target backup task;
  determining, based on the start time and the historical execution duration, an execution time interval in which the target backup task is executed; and
  determining, based on the execution time interval, at least one of:
    an amount of data written into the backup system within the execution time interval;
    a number of backup tasks executed concurrently within the execution time interval, the number exceeding a threshold number;
    a total number of backup tasks executed at least partially within the execution time interval; and
    whether the execution time interval at least partially overlaps a system maintenance time interval of the backup system.

9. The electronic device of claim 8, wherein determining the execution time interval in which the target backup task is executed comprises:
  determining the execution time interval based on the start time and the historical execution duration; and
  adjusting the execution time interval to a predetermined time format.

10. The electronic device of claim 7, wherein determining the score for the scheduling setting comprises:
  determining a first criterion associated with one or more of the plurality of types of the execution information, the first criterion being used to evaluate a degree of impact of the type of the execution information on the performance of the backup system;
  determining, based on the first criterion associated with the respective type of the execution information, a level of impact for each type of the plurality of types of the execution information on the performance of the backup system; and
  determining the score for the scheduling setting based on the level for each type of the plurality of types of the execution information.

11. The electronic device of claim 10, wherein determining the score for the scheduling setting based on the level comprises:
    determining the score from a first score range according to a determination that the level is not lower than a threshold level, the first score range indicating that the scheduling setting is not suitable for the target backup task; and
    determining the score from a second score range according to a determination that the level is lower than the threshold level, the second score range indicating that the scheduling setting is suitable for the target backup task.

12. The electronic device of claim 10, wherein determining the score for the scheduling setting based on the level comprises:
    acquiring another scheduling setting for the target backup task, the another scheduling setting being different from the scheduling setting;
    determining, based on the another scheduling setting, another level of impact for each of the plurality of types of the execution information on the performance of the backup system;
    determining a weight corresponding to a respective type of the execution information, the weight indicating a relative degree of impact of the type of execution information on the performance of the backup system compared with other types of execution information; and
    determining, based on the level, the another level, and the weight, the score for the scheduling setting and another score for the another scheduling setting.

13. A computer program product tangibly stored in a non-transitory computer-storage medium and comprising machine-executable instructions, wherein when executed by a device, the machine-executable instructions cause the device to perform actions, the actions comprising:
    acquiring a scheduling setting for a target backup task, the scheduling setting specifying at least a start time of executing the target backup task in a backup system;
    acquiring a plurality of types of execution information associated with execution of the target backup task according to the scheduling setting;
    performing a pairwise comparison of each of the plurality of types of execution information, wherein the pairwise comparison determines a relative weight of each of the plurality of types of execution information with respect to every other one of the plurality of types of execution information, respectively; and
    determining a score for the scheduling setting based on a pairwise comparison of each of the plurality of types of the execution information, the score indicating a degree of impact of the execution of the target backup task according to the scheduling setting on a performance of the backup system.

14. The computer program product of claim 13, wherein acquiring the plurality of types of the execution information comprises:
    acquiring a historical execution duration of the target backup task;
    determining, based on the start time and the historical execution duration, an execution time interval in which the target backup task is executed; and
    determining, based on the execution time interval, at least one of:
    an amount of data written into the backup system within the execution time interval;
    a number of backup tasks executed concurrently within the execution time interval, the number exceeding a threshold number;
    a total number of backup tasks executed at least partially within the execution time interval; and
    whether the execution time interval at least partially overlaps a system maintenance time interval of the backup system.

15. The computer program product of claim 14, wherein determining the execution time interval in which the target backup task is executed comprises:
    determining the execution time interval based on the start time and the historical execution duration; and
    adjusting the execution time interval to a predetermined time format.

16. The computer program product of claim 13, wherein determining the score for the scheduling setting comprises:
    determining a first criterion associated with one or more of the plurality of types of the execution information, the first criterion being used to evaluate a degree of impact of the type of the execution information on the performance of the backup system;
    determining, based on the first criterion associated with the respective type of the execution information, a level of impact for each type of the plurality of types of the execution information on the performance of the backup system; and
    determining the score for the scheduling setting based on the level for each type of the plurality of types of the execution information.

17. The computer program product of claim 16, wherein determining the score for the scheduling setting based on the level comprises:
    determining the score from a first score range according to a determination that the level is not lower than a threshold level, the first score range indicating that the scheduling setting is not suitable for the target backup task; and
    determining the score from a second score range according to a determination that the level is lower than the threshold level, the second score range indicating that the scheduling setting is suitable for the target backup task.

18. The computer program product of claim 16, wherein determining the score for the scheduling setting based on the level comprises:
    acquiring another scheduling setting for the target backup task, the another scheduling setting being different from the scheduling setting;
    determining, based on the another scheduling setting, another level of impact for each of the plurality of types of the execution information on the performance of the backup system;
    determining a weight corresponding to a respective type of the execution information, the weight indicating a relative degree of impact of the type of execution information on the performance of the backup system compared with other types of execution information; and
    determining, based on the level, the another level, and the weight, the score for the scheduling setting and another score for the another scheduling setting.

19. The method of claim 4, further comprising:
    generating the pairwise comparison of each of the plurality of types of the execution information by comparing a relative impact of each of the plurality of types of the execution information with respect to each of the other types of the execution information;

generating a weight for each of the plurality of types of the execution information based on the pairwise comparison; and determining the score for the scheduling setting based on the level and weight for each type of the plurality of types of the execution information.

20. The electronic device of claim 10, further comprising:

generating the pairwise comparison of each of the plurality of types of the execution information by comparing a relative impact of each of the plurality of types of the execution information with respect to each of the other types of the execution information;

generating a weight for each of the plurality of types of the execution information based on the pairwise comparison; and determining the score for the scheduling setting based on the level and weight for each type of the plurality of types of the execution information.

* * * * *